United States Patent
Choi et al.

(10) Patent No.: US 10,149,319 B2
(45) Date of Patent: Dec. 4, 2018

(54) METHOD FOR PERFORMING SCANNING IN WIRELESS ACCESS SYSTEM SUPPORTING MILLIMETER WAVE, AND DEVICE SUPPORTING SAME

(71) Applicant: LG ELECTRONICS INC., Seoul (KR)

(72) Inventors: Kukheon Choi, Seoul (KR); Hyunsoo Ko, Seoul (KR); Jaehoon Chung, Seoul (KR); Kwangseok Noh, Seoul (KR); Dongkyu Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/555,058

(22) PCT Filed: Mar. 9, 2015

(86) PCT No.: PCT/KR2015/002245
§ 371 (c)(1),
(2) Date: Aug. 31, 2017

(87) PCT Pub. No.: WO2016/143917
PCT Pub. Date: Sep. 15, 2016

(65) Prior Publication Data
US 2018/0042045 A1 Feb. 8, 2018

(51) Int. Cl.
*H04W 64/00* (2009.01)
*H04W 74/02* (2009.01)
(Continued)

(52) U.S. Cl.
CPC .............. *H04W 74/02* (2013.01); *H04B 7/04* (2013.01); *H04W 8/005* (2013.01); *H04W 16/14* (2013.01);
(Continued)

(58) Field of Classification Search
CPC ..... H04W 74/02; H04W 8/005; H04W 16/14; H04W 74/08; H04W 88/10; H04W 48/16; H04W 16/28; H04B 7/04
See application file for complete search history.

(56) References Cited

U.S. PATENT DOCUMENTS

| 2011/0038357 A1* | 2/2011 | Gong ................... H04W 48/16 370/338 |
| 2011/0182174 A1 | 7/2011 | Pi et al. |

(Continued)

OTHER PUBLICATIONS

PCT International Application No. PCT/KR2015/002245, Written Opinion of the International Searching Authority dated Dec. 10, 2015, 15 pages.

*Primary Examiner* — Jay P Patel
(74) *Attorney, Agent, or Firm* — Lee, Hong, Degerman, Kang & Waimey PC

(57) ABSTRACT

The present invention relates to methods for determining whether to perform millimeter wave (mmWave) scanning in a mmWave system, and a device supporting same. The method for a terminal performing mmWave scanning in a wireless access system supporting mmWave technology, according to one embodiment of the present invention, comprises the steps of: attempting to detect a mmWave pilot signal by monitoring a mmWave pilot detection window in a mmWave band; and transmitting, to an uplink of a legacy band, a feedback signal for indicating whether the mmWave pilot signal is detected, wherein the method may further comprise the step of, if the mmWave pilot signal is detected, performing mmWave ray scanning with a base station, or the step of, if the mmWave pilot signal is not detected, determining whether to perform mmWave beam scanning or whether to perform legacy communication.

10 Claims, 10 Drawing Sheets

(51) Int. Cl.
*H04B 7/04* (2017.01)
*H04W 16/14* (2009.01)
*H04W 74/08* (2009.01)
*H04W 8/00* (2009.01)
*H04W 16/28* (2009.01)
*H04W 48/16* (2009.01)
*H04W 88/10* (2009.01)

(52) U.S. Cl.
CPC ............ *H04W 74/08* (2013.01); *H04W 16/28* (2013.01); *H04W 48/16* (2013.01); *H04W 88/10* (2013.01)

(56) References Cited

U.S. PATENT DOCUMENTS

| | | | |
|---|---|---|---|
| 2011/0199966 A1* | 8/2011 | Cordeiro | H04W 16/14 370/328 |
| 2013/0088983 A1 | 4/2013 | Pragada et al. | |
| 2014/0204846 A1 | 7/2014 | Maltsev et al. | |
| 2014/0321282 A1 | 10/2014 | Pragada et al. | |
| 2015/0063295 A1 | 3/2015 | Himayat et al. | |
| 2018/0034500 A1* | 2/2018 | Choi | H04B 7/04 |
| 2018/0049154 A1* | 2/2018 | Choi | H04W 16/28 |

* cited by examiner

Time taken for UE having predetermined
bandwidth for one BS beam direction to
perform scanning in all directions Transmit pilot with determined Rx beam
and determine Tx beam

FIG. 5
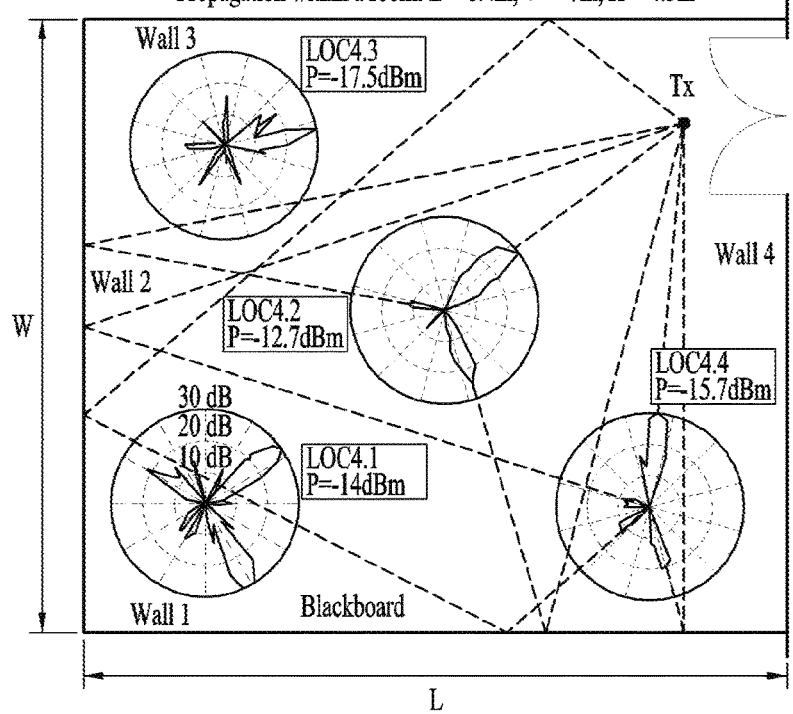
(a) 60GHz indoor AoA measurement
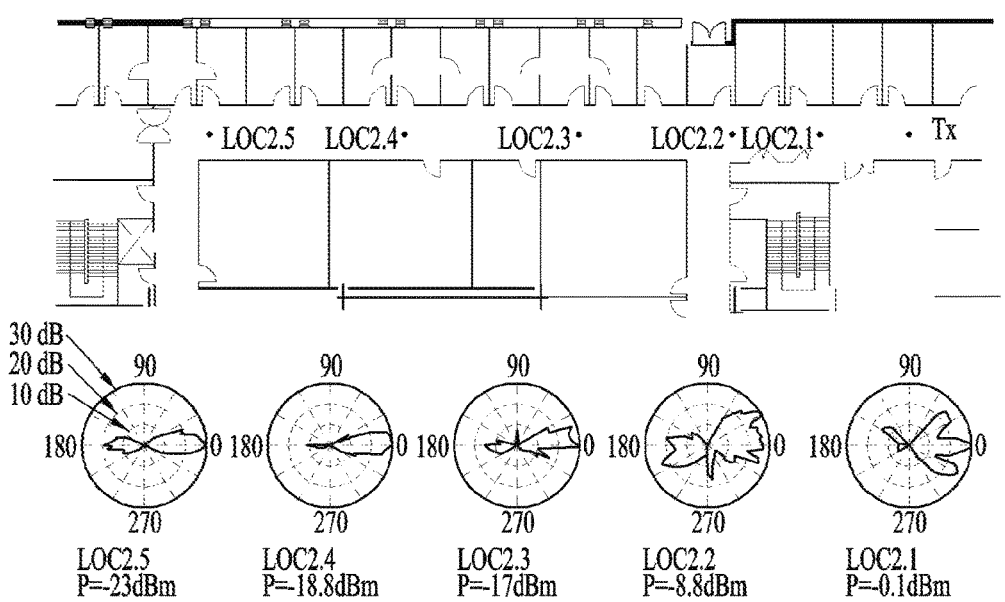
(b) 60GHz corridor AoA measurement FIG. 6
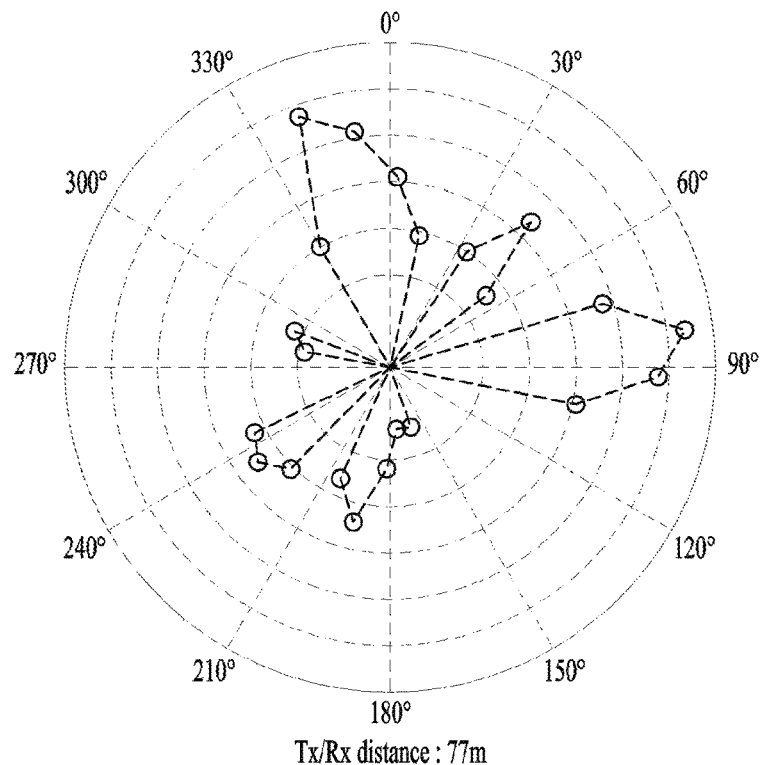
Tx/Rx distance : 77m
(a)
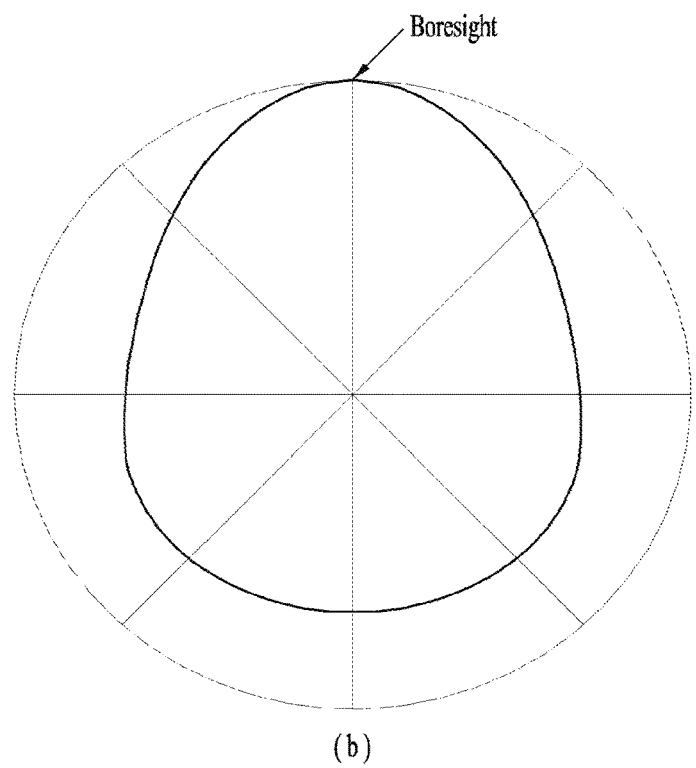
(b)

FIG. 7
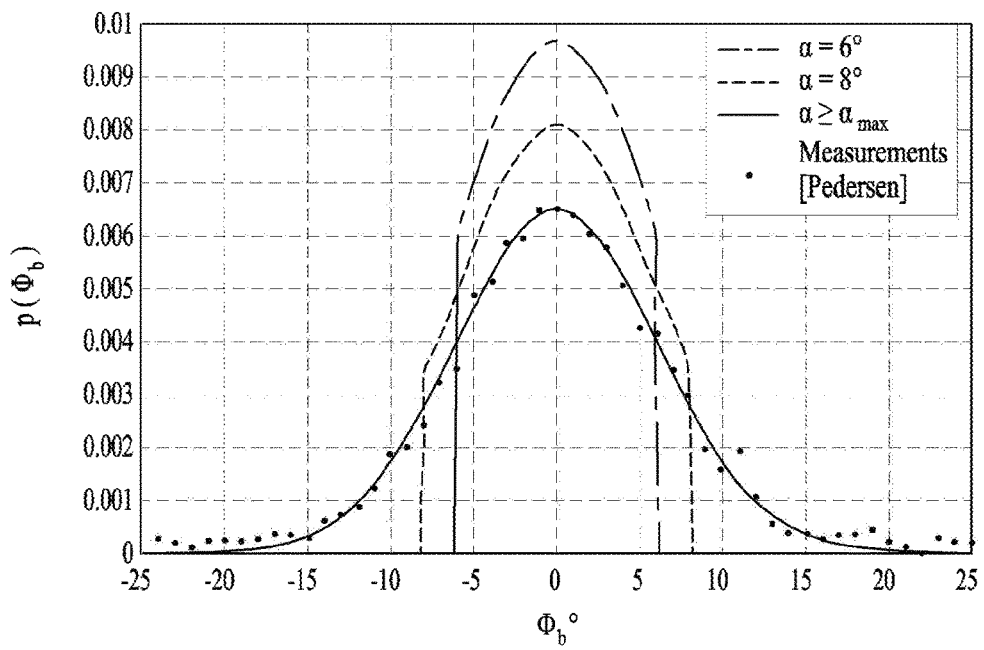
(a) PAS change according to beam width
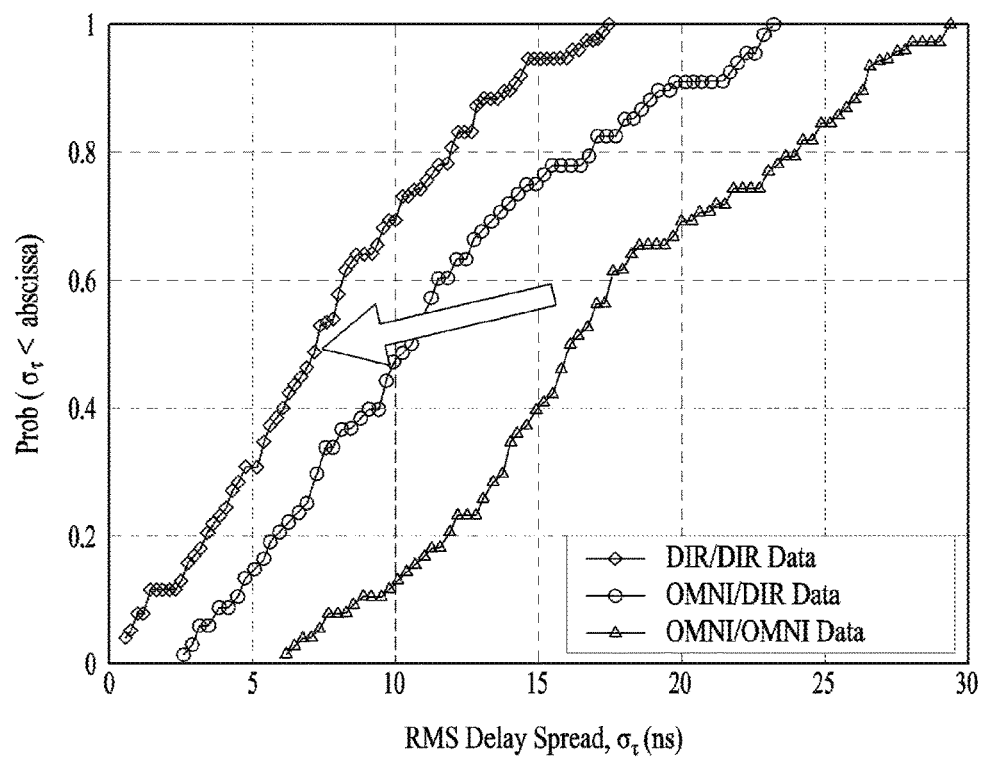
(b) RMS DS change by directional antenna

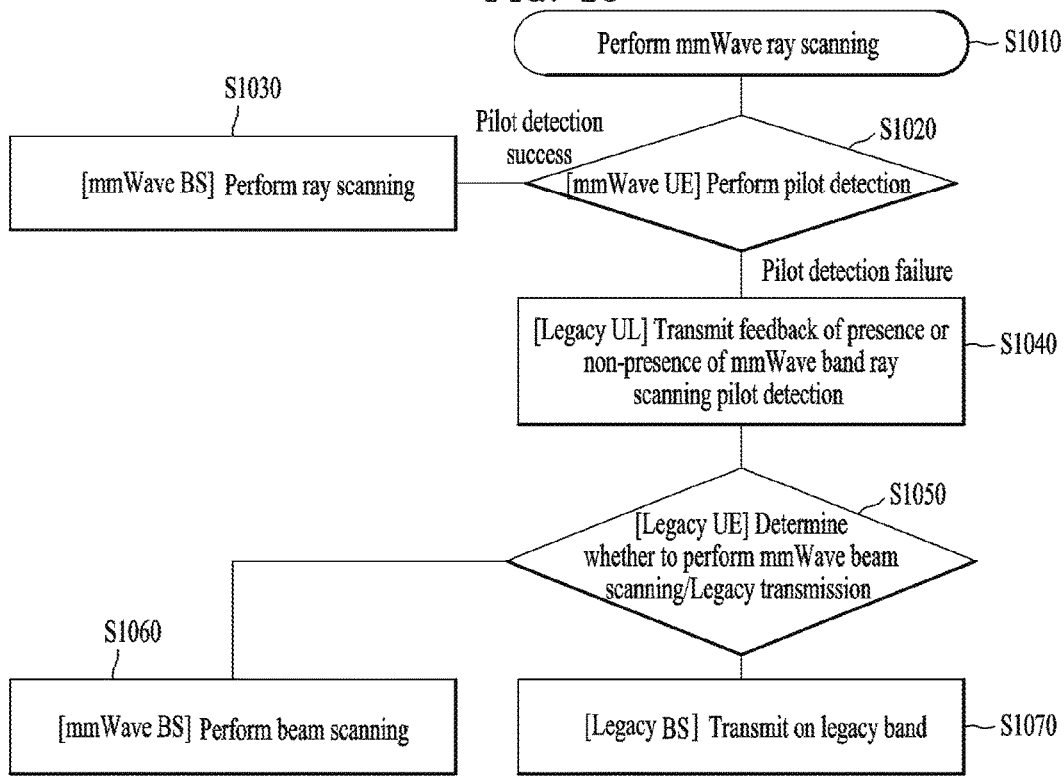
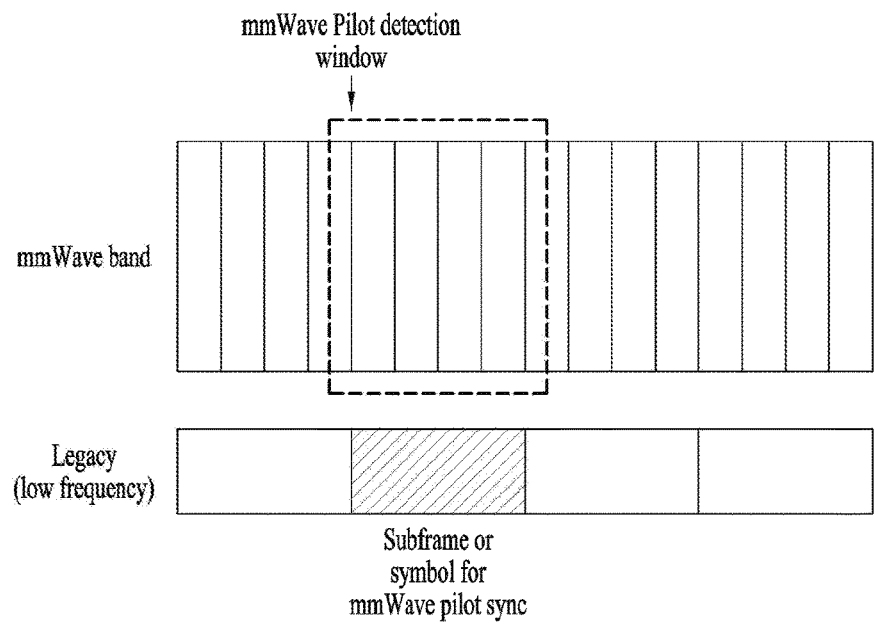

METHOD FOR PERFORMING SCANNING IN WIRELESS ACCESS SYSTEM SUPPORTING MILLIMETER WAVE, AND DEVICE SUPPORTING SAME

CROSS-REFERENCE TO RELATED APPLICATIONS

This application is the National Stage filing under 35 U.S.C. 371 of International Application No. PCT/KR2015/002245, filed on Mar. 9, 2015, the contents of which are hereby incorporated by reference herein in its entirety.

TECHNICAL FIELD

The present invention relates to a wireless access system, and more particularly, to methods for determining whether to perform an mmWave scanning in a millimeter wave (mmWave) system, methods for defining a pilot signal of a legacy band for supporting an mmWave scanning therefor, and apparatus for supporting the same.

BACKGROUND ART

Wireless access systems have been widely deployed to provide various types of communication services such as voice or data services. Generally, a wireless access system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

When an existing beamforming method applies to an mmWave system used on high frequency band, it may cause a problem that a considerably long time delay is generated from a beam searching and a problem that unique channel property of a radio channel cannot be obtained. Moreover, there is a problem that an existing ray scanning method is applicable to a system having a small cell size only.

DISCLOSURE OF THE INVENTION

Technical Task

The present invention is devised to solve the above problems, and one technical task of the present invention is to provide an efficient scanning method in an mmWave system and a data transceiving method.

Another technical task of the present invention is to provide methods for determining whether to perform a ray scanning or a beam scanning in an mmWave system.

Another technical task of the present invention is to provide methods for determining whether to perform a beam scanning or a legacy communication through a legacy band in an mmWave system.

Another technical task of the present invention is to provide a method of defining a legacy pilot signal to support an mmWave scanning.

Another technical task of the present invention is to provide a method for determining whether to perform an mmWave scanning based on an mmWave pilot signal and a legacy pilot signal.

Further technical task of the present invention is to provide an apparatus for supporting the above mentioned methods.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

The present invention relates to methods for determining whether to perform an mmWave scanning in a millimeter wave (mmWave) system, methods for defining a pilot signal of a legacy band for supporting an mmWave scanning therefor, and apparatus for supporting the same.

In one technical aspect of the present invention, provided herein is a method of performing an mmWave scanning by a user equipment in a wireless access system supportive of a millimeter wave (mmWave) technology, including attempting a detection of an mmWave pilot signal by monitoring an mmWave pilot detection window on an mmWave band, transmitting a feedback signal for indicating whether the mmWave pilot signal is detected in uplink of a legacy band, if the mmWave pilot signal is detected, performing an mmWave ray scanning with a base station, and if the mmWave pilot signal is not detected, determining whether to perform an mmWave beam scanning or a legacy communication.

If the mmWave pilot signal is not detected, the user equipment may determine whether to perform the mmWave beam scanning or the legacy communication by estimating a reception power of the mmWave pilot signal based on a reception power of a legacy pilot signal transmitted through the legacy band.

The method may further include transmitting feedback information through the legacy band in order for the user equipment to inform the base station whether the mmWave beam scanning or the legacy communication is performed.

Here, the mmWave pilot detection window may be configured to correspond to a transmitted location of a specific legacy pilot among legacy pilots transmitted through the legacy band.

Here, the mmWave pilot detection window may be configured to correspond to a transmitted location of a new legacy pilot defined on the legacy band for the detection of the mmWave pilot signal.

In another technical aspect of the present invention, provided herein is a user equipment performing an mmWave scanning in a wireless access system supportive of a millimeter wave technology, including a transmitter, a receiver, and a processor configured to support the mmWave scanning.

Here, the processor may be further configured to control the receiver to attempt a detection of an mmWave pilot signal by monitoring an mmWave pilot detection window on an mmWave band and control the transmitter to transmit a feedback signal for indicating whether the mmWave pilot signal is detected in uplink of a legacy band. If the mmWave pilot signal is detected, the processor may be further configured to perform an mmWave ray scanning with a base station. If the mmWave pilot signal is not detected, the processor may be further configured to determine whether to perform an mmWave beam scanning or a legacy communication.

If the mmWave pilot signal is not detected, the processor may determine whether to perform the mmWave beam scanning or the legacy communication by estimating a reception power of the mmWave pilot signal based on a reception power of a legacy pilot signal transmitted through the legacy band.

The processors may be configured to control the transmitter to transmit feedback information through the legacy band in order to inform the base station whether the mmWave beam scanning or the legacy communication is performed.

The mmWave pilot detection window may be configured to correspond to a transmitted location of a specific legacy pilot among legacy pilots transmitted through the legacy band.

The mmWave pilot detection window may be configured to correspond to a transmitted location of a new legacy pilot defined on the legacy band for the detection of the mmWave pilot signal.

The above aspects of the present invention are just parts of preferred embodiments of the present invention, and various embodiments reflecting the technical features of the present invention can be derived and understood from the following description by those having ordinary skill in the technical field to which the present invention pertains.

Advantageous Effects

According to embodiments of the present invention, the following effects are provided.

First of all, using the present invention, a scanning can be efficiently performed in an mmWave system.

Secondly, by determining whether to perform a ray scanning, a beam scanning or a legacy communication in an mmWave system, an mmWave or legacy service can be provided with a base station according to a location of a user equipment.

Thirdly, by defining a legacy pilot signal for supporting an mmWave scanning, an mmWave user equipment can detect an mmWave pilot more easily.

Fourthly, by determining whether to perform an mmWave scanning based on an mmWave pilot signal and a legacy pilot signal, a user equipment can determine to perform a prescribed scanning despite failing to receive the mmWave pilot signal.

Effects obtainable from the present invention are non-limited by the above mentioned effect. And, other unmentioned effects can be clearly understood from the following description by those having ordinary skill in the technical field to which the present invention pertains. Namely, effects unintended in implementing the present invention can be derived from the embodiments of the present invention by those having ordinary skill in the technical field to which the present invention pertains as well.

DESCRIPTION OF DRAWINGS

The accompanying drawings, which are included to provide a further understanding of the invention and are incorporated in and constitute a part of this specification, illustrate embodiments of the invention. And, the accompanying drawings are used to describe embodiments of the present invention together with the detailed description.

FIG. 5 is a diagram showing one example of PAS distribution according to a location of each transceiving end on 60 GHz band.

FIG. 6 is a diagram showing one example of PAS distribution according to a location of each transceiving end on 28 GHz band.

FIG. 7 is a diagram showing one example of effect for a directional antenna in an mmWave system.

FIG. 10 is a flowchart for determining an mmWave scanning method.

FIG. 11 is a diagram showing a case of determining an mmWave pilot detection window for transmitting an mmWave pilot signal based on locations of a legacy frame and symbol.

BEST MODE FOR INVENTION

Figure 1:
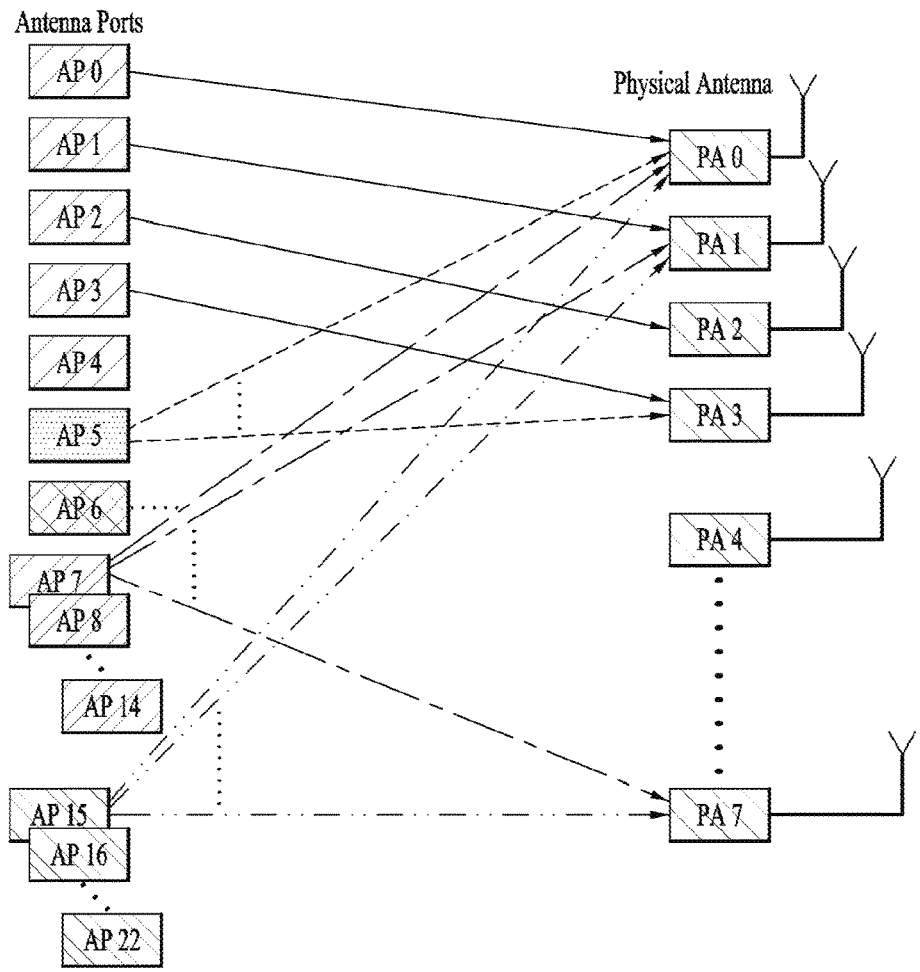
FIG. 1 is a diagram showing one example of an antenna port used in mmWave.

The following embodiments of the present invention described in detail provide a method for performing scanning to reduce mmWave scanning overhead using UE position information in a mmWave system, and apparatuses for supporting the same.

The following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the description of the drawings, procedures, steps and the like that may obscure the concept of the present invention are not described and procedures or steps on the level understandable by those skilled in the art are not described as well.

In the whole specification, if a prescribed part 'comprises or includes' a prescribed component, this means that other components can be further included instead of excluding them unless a presence of especially opposed description. A term such as '~part', '~unit', 'module' and the like means a unit for processing at least one function or operation, which can be implemented by hardware, software or combination of hardware and software. Moreover, 'a or an', 'one', 'the' and similar related terms can be used as the meaning of including the singular and the plural both unless differently indicated in the present specification or clearly refuted by context.

In this specification, embodiments of the present invention are described centering on the data transmission/reception relations between a base station and a mobile station. In this case, the base station may be meaningful as a terminal node of a network which directly performs communication with the mobile station. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other networks except the base station. Herein, 'base station (BS)' may be substituted with such a terminology as a fixed station, a Node B, an eNodeB (eNB), an advanced base station (ABS), an access point (AP) or the like.

In the embodiments of the present invention, a terminal may be substituted with such a terminology as a user equipment (UE), a mobile station (MS), a subscriber station (SS), a mobile subscriber station (MSS), a mobile terminal, an advanced mobile station (AMS), or the like.

A transmitting end means a fixed and/or mobile node providing a data or voice service and a receiving end means a fixed and/or mobile node receiving a data or voice service. Hence, a mobile station and a base station may become a transmitting end and a receiving end in uplink, respectively. Likewise, a mobile station and a base station may become a receiving end and a transmitting end, respectively.

Embodiments of the present invention may be supported by the disclosed standard documents of at least one of wireless access systems including IEEE 802.xx system, 3GPP (3$^{rd}$ generation partnership project) system, 3GPP LTE system, and 3GPP2 system. Particularly, the embodiments of the present invention can be supported by documents of 3GPP TS 36.211, 3GPP TS 36.212, 3GPP TS 36.213, 3GPP TS 36.321 and 3GPP TS 36.331. In particular, the steps or parts, which are not explained to clearly reveal the technical idea of the present invention, in the embodiments of the present invention may be supported by the above documents. Moreover, all terminologies disclosed in this document may be supported by the above standard documents.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

Specific terminologies used for the following description may be provided to help the understanding of the present invention. And, the use of the specific terminology may be modified into other forms within the scope of the technical idea of the present invention.

For instance, a cellular system may mean an LTE or LTE-A system, and a mmWave system may mean a system supportive of mmWave in the LTE or LTE-A system. Namely, the mmWave system means a wireless access system supportive of mmWave property. Moreover, a term called 'ray' in the embodiments of the present invention may mean a unique signal generated from mmWave link or a cluster of unique signals in case of not performing beamforming.

3GPP LTE/LTE-A system as one example of a wireless access system usable for embodiments of the present invention is described as follows.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) system is an evolved version of 3GPP LTE system. To clarify the description of the technical features of the present invention, the description is made centering on 3GPP LTE/LTE-A system and may apply to IEEE 802.16e/m system and the like as well.

1. Millimeter Wave (mmWave)

The present invention relates to a signal transceiving method for detection of site specific ray property information unique to mmWave link and detection of abundant resolvable ray and apparatuses supporting the same. Due to an existing short mmWave cell range, it is essential to perform a beamforming for obtaining a transceiving antenna beam gain. Hence, a beamforming based beam scanning scheme has been proposed as a mmWave scanning scheme as well. Yet, such technologies have disadvantage that a transceiving scanning delay increases due to overhead according to a beam scanning.

A ray scanning scheme proposed by the present invention is effective in reducing a large overhead according to a beam scanning scheme by detecting a unique feature of a mmWave environment. Moreover, since information attributed to a transceived beam scanning of a user equipment is not unique property information (e.g., PDP (power delay profile, PAS (power azimuth spectrum, etc.) of channel, it can be used for acquisition and application of information unique to a channel.

1.1 Antenna Port

FIG. 1 is a diagram showing one example of an antenna port used in mmWave.

An antenna port is a virtual concept for a physical antenna. An output outputted through an antenna port should include a reference signal (RS). As an output outputted through a single antenna port includes an RS, it may be regarded as an antenna stream unit that can be received in a manner that a user equipment detects the RS and then estimates a channel.

Hence, no matter whether a single antenna stream is transmitted through two or more physical antennas or several physical antennas by spatial precoding (i.e., one of transmission beamforming), a user equipment can perform a reception by assuming a single antenna port.

Referring to FIG. 1, a physical antenna is configured by a separate mapping to an antenna port, and mapping between a physical antenna and an antenna port is determined according to a vender. Hence, it is unnecessary to consider an implementation problem of a physical antenna, but descriptions of a method of transmitting a signal or data per antenna port are taken into consideration.

1.2 Antenna Port Configuration of LTE System

The following Table 1 shows antenna ports used for physical channels and signals.

TABLE 1

| Physical channel or signal | Index $\tilde{p}$ | Antenna port number p as a function of the number of antenna ports configured for the respective physical channel/signal | | |
|---|---|---|---|---|
| | | 1 | 2 | 4 |
| PUSCH | 0 | 10 | 20 | 40 |
| | 1 | — | 21 | 41 |
| | 2 | — | — | 42 |
| | 3 | — | — | 43 |
| SRS | 0 | 10 | 20 | 40 |
| | 1 | — | 21 | 41 |
| | 2 | — | — | 42 |
| | 3 | — | — | 43 |
| PUCCH | 0 | 100 | 200 | — |
| | 1 | — | 201 | — |

1.2.1 Precoding

A precoder of a transmitting end takes a block vector $[y^{(0)}(i) \ldots y^{(v-1)}(i)]^T$, $i=0, 1, \ldots, M_{symb}^{layer}-1$ as an input from a transmitting precoder and generates a block vector $[z^{(0)}(i) \ldots z^{(P-1)}(i)]^T$, $i=0, 1, \ldots, M_{symb}^{ap}-1$ mapped to resource elements.

Regarding the precoding for transmission on a single antenna port, the precoding is defined as $z^{(0)}(i)=y^{(0)}(i)$. Herein, $i=0, 1, \ldots, M_{symb}^{ap}-1$ and $M_{symb}^{ap}=M_{symb}^{layer}$.

The precoding for spatial multiplexing is only used together with a layer mapping for spatial multiplexing. Spatial multiplexing supports antenna port P=2 or P=4, and antenna port sets used for spatial multiplexing includes $p \in \{20,21\}$ and $p \in \{40,41,42,43\}$ respectively.

Precoding for spatial multiplexing is defined as $$\begin{bmatrix} z^{(0)}(i) \\ \vdots \\ z^{(P-1)}(i) \end{bmatrix} = W \begin{bmatrix} y^{(0)}(i) \\ \vdots \\ y^{(v-1)}(i) \end{bmatrix}.$$

Herein $i=0, 1, \ldots, M_{symb}^{ap}-1$ and $M_{symb}^{ap}=M_{symb}^{layer}$.

A precoding matrix W having a size P×v for an antenna port P=2 is given by one of the entries shown in Table 2.

TABLE 2

| | Number of layers | |
|---|---|---|
| Codebook index | $v=1$ | $v=2$ |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

A precoding matrix W having a size P×v for an antenna port P=4 is given by one of the entries shown in Table 3. In Table 3, each row is represented in order of increasing a codebook index from the left to the right. Table 3 shows a case that v is 1. If v is 2 to 4, Tables 5.3.3A.2-3 to 5.3.3A2-5 of TS36.211 v12.3 specifications are referred to.

TABLE 3

| Codebook index | Number of layers $v=1$ |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |

TABLE 3-continued

| Codebook index | Number of layers $\upsilon = 1$ |
|---|---|
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

1.2.2 Mapping for Physical Resource

Regarding each antenna port p used for PUSCH (Physical Uplink Shared Channel) transmission in a subframe, a block $z^{(\tilde{p})}(0), \ldots, z^{(\tilde{p})}(M_{symb}^{ap}-1)$ of complex symbols should be multiplied by an amplitude scaling factor $\beta_{PUSCH}$ to secure a transmit power $P_{PUSCH}$, mapped to a sequence starting with $z^{(\tilde{p})}(0)$ for physical resource blocks for the antenna port p, and is assigned for PUSCH transmission. Relation between an index $\tilde{p}$ and an antenna port p is given by Table 1. Mapping for a resource element corresponding to a physical resource block for transmission starts from a first slot of a corresponding subframe and is mapped in increasing order of index l after index k.

Moreover, regarding mapping for a resource element (k,l) corresponding to a physical resource block; (1) it is not used for transmission of a reference source; (2) if a user equipment performs SRS transmission in a specific subframe, it is not mapped to a last SC-FDMA symbol of a corresponding subframe; (3) if PUSCH transmission overlaps with a cell-specific SRS bandwidth partially or fully, it is not mapped to a last SC-FDMA symbol within a subframe configured with a corresponding cell-specific SRS; (4) it is not mapped to a part of SC-FDMA symbol reserved for SRS transmission possible in UE-specific aperiodic SRS subframe; and (5) if UE is configured with multiple TAG, it is not mapped to a port of SC-FDMA symbol reserved for possible SRS transmission in UE-specific periodic SRS subframe within a specific serving cell.

For details of physical resource mapping for antenna port p, Paragraph 5.3.4 of v12.1 version of 3GPP TS36.211 specifications can be referred to.

1.3 Cell Search (Measurement, Evaluation, Detection) Method

The term "cell search" used in the embodiments is a collective term indicating a combination of measurement, evaluation, and detection processes. Cell search may be a first step to be initially performed before the UE performs cell selection, and may be very closely associated with the cell selection process. In addition, the cell search process may greatly affect energy consumption of an idle-mode UE.

The term "DRX cycle" used in cell search may be a kind of timer. The measurement, evaluation, and/or detection process(es) may be performed for a specific time defined by the number of DRX cycles. In the idle mode, the DRX cycle may be decided by the network on the basis of the SIB1 message.

The term "scan" is not explicitly defined in standard documents, most UEs may perform this scanning process. The scanning process may be a tuning process for a specific frequency, and may be the simplest signal (e.g., Received Signal Strength Indicator (RSSI), etc.) quality measurement procedure. Generally, the UE may first perform the scan process before the measurement and evaluation processes. In order to perform the next process (e.g., measurement, evaluation, etc.), a small number of candidates may be selected. If the UE immediately performs the measurement and evaluation process for all available frequencies and bands, the UE may consume an excessively long period of time and an excessively large amount of power.

The measurement process is a process for measuring RSRP and RSRQ (Reference Signal Received Quality), and may be performed according to LTE/LTE-A 36.133 in association with measurement of all non-serving cells. The evaluation process may be a process for confirming a cell selection reference on the basis of the result of the measurement process. The detection process may perform tuning and synchronization of a specific frequency, and may decode basic information of the cells.

One example of the initial scan and cell search process for a WCDMA system will hereinafter be given. The WCDMA system is a previous version of the LTE/LTE-A system, and the following description can also be applied to LTE/LTE-A system.

If the UE is initially powered on or exits cell coverage, the UE may detect and search for a new cell. The UE must perform blind decoding because it is impossible to recognize which frequency of a certain cell will be used for UE camp-on. For example, it is assumed that the UE supports WCDMA Band I. In this case, the BS located in the vicinity of the UE may use frequency channels 10562 to 10838. In other words, the UE may use 276 available frequencies.

Under this assumption, the UE may measure RSSI for each of the supported channels. RSSI may be a measurement value (e.g., energy, power, etc.) capable of being measured by the UE. RSSI measurement need not use the channel coding process. Therefore, the UE need not recognize any of information regarding the network. That is, in order for the UE to detect a physical cell identifier (ID), the WCDMA system need not decode a PCPICH and the LTE system need not decode synchronous/reference signals. The UE has only to measure power for each channel. The UE may measure RSSI for each channel, such that the UE may generate the list of channel numbers using the measured RSSI.

Subsequently, the UE may sort channels, each of which has RSSI higher than a threshold value, using the generated list of channel numbers. Thereafter, the UE may perform the following steps to search for an appropriate candidate needed for UE camp-on.

The UE may decode a PDPICH or synchronous/reference signals, so that the UE may detect the physical cell ID and perform power measurement. The UE may construct the list of candidate cells for the detected physical cell IDs.

The UE may perform MIB decoding for all candidate cells on the basis of the constructed list of candidate cell IDs.

Upon receiving USIM information and the list of candidate cells, the UE may determine which cell is the best cell appropriate for UE camp-on, and may perform system information and registration processes.

1.3 Problems of mmWave

An existing ray scanning scheme has a small cell boundary due to the omniantenna property of mmWave and a resolvable ray is eventually detected from a small cell area only. Hence, how to raise the probability of detection of a resolvable ray without the help of a beamforming gain on ray scanning is a major problem. Moreover, since a mmWave link sensitively changes in a link environment according to a location environment of a user equipment, acquisition of site-specific initial environment information is a major problem as well.

Figure 2:
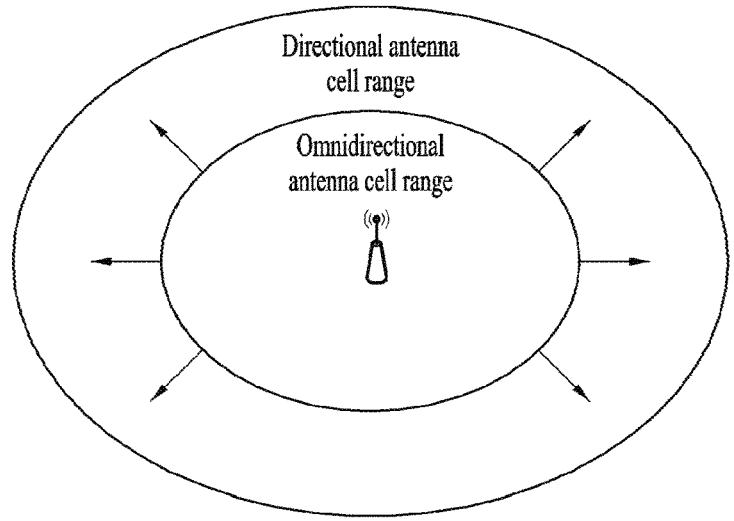
FIG. 2 is a diagram showing one example of cell radiuses that can be covered by an omnidirectional antenna and a directional antenna, respectively.

FIG. 2 is a diagram showing one example of cell radiuses that can be covered by an omnidirectional antenna and a directional antenna, respectively.

Referring to FIG. 2, a range of a cell covered by an omnidirectional antenna is wider than a cell range covered by a directional antenna. When a directional antenna is used in mmWave, there is a problem that a range gain of a beamforming is reduced by about −20 dB. Hence, although it is preferable to use an omnidirectional antenna, a case of mmWave has a problem that channel characteristic rapidly changes according to a user location.

There are the above-mentioned problems due to the property of the mmWave technology that uses the omnidirectional antenna. Therefore, the present invention is directed to overcome the above problems and propose methods of increasing a cell range coverable by an omnidirectional antenna up to a range covered by a directional antenna.

2. Scanning Method for Directional Antenna 2.1 Beam Scanning Method

Beam scanning methods are schematically described as follows.

Figure 3:
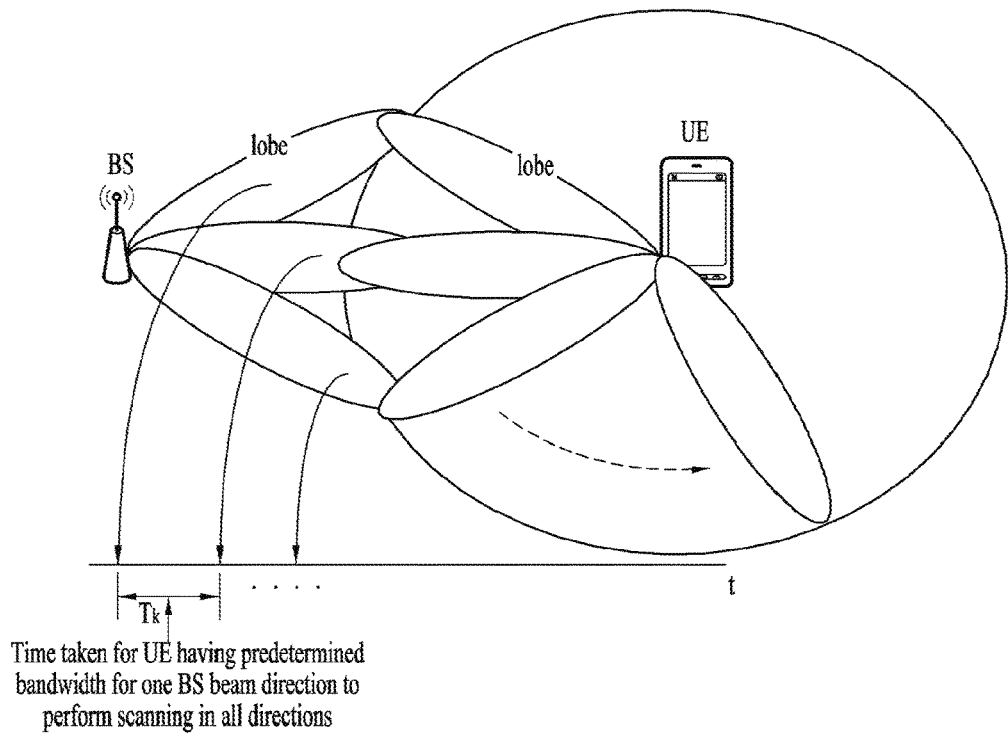
FIG. 3 is a diagram showing one example of an initial stage of a received beam scanning for a transmitted beam scanning.
Figure 4:
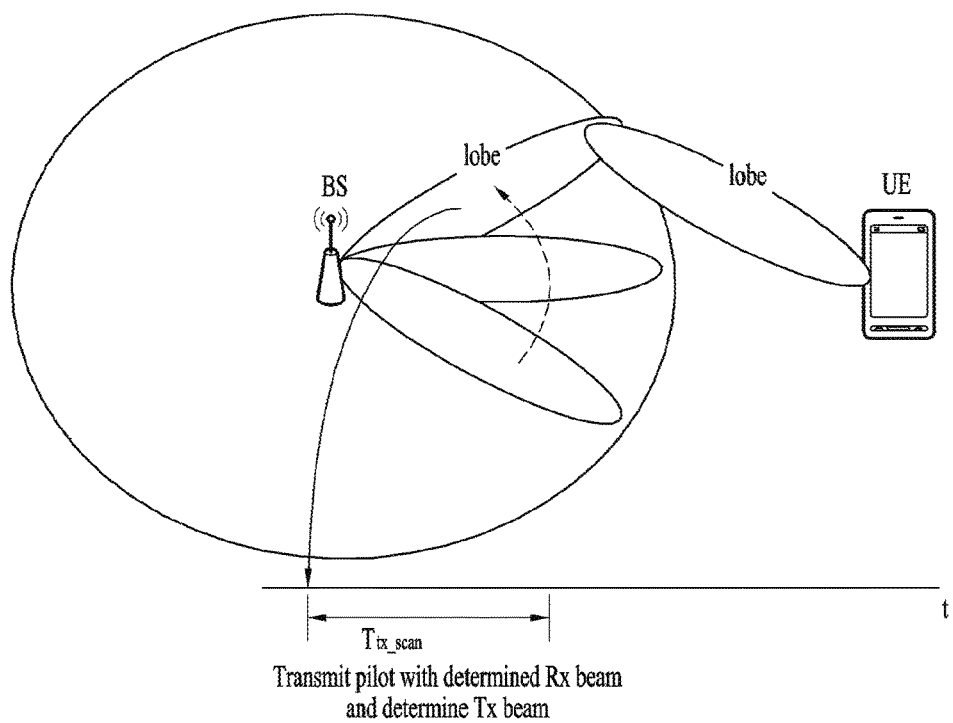
FIG. 4 is a diagram showing one of methods for performing a beam scanning in a transmitting end after fixing a received lobe index in a receiving side.

FIG. 3 is a diagram showing one example of an initial stage of a received beam scanning for a transmitted beam scanning. FIG. 4 is a diagram showing one of methods for performing a beam scanning in a transmitting end after fixing a received lobe index in a receiving side.

If a transmitted beam codebook of a base station is determined in an initial stage of a beam scanning, while a corresponding transmitted beam is fixed, a receiving side, i.e., a user equipment derives a PDP (power delay profile) according to each beam by rotating a received beam scanning at 360°. In this case, the user equipment selects an index of a received lobe having a ray with a biggest power among the detected PDPs. Herein, the lobe means each radiation group in case that energy distribution of electric waves radiated from an antenna is divided in several directions. Namely, it means a prescribed form of a beam in performing a beam scanning.

Formula 1 is used to calculate SNR of each lobe detected by a user equipment.

$$\operatorname*{argmax}_{i\ w_i} |H_i^{(k)} w_i|^2 \frac{p_i^2}{\sigma_n^2} \quad \text{[Formula 1]}$$

In Formula 1, $H_i^{(k)}$ means a radio channel of an $i^{th}$ lobe for a transmitted beam k, $w_i$ means a precoding matrix, $p_i$ means a reception power, sigma ($\sigma$) means a size of noise, sigma square means a power of noise.

When a time for completing a received (Rx) beam scanning for a fixed transmitted (Tx) beam lobe is defined as $\tau_k$, as shown in FIG. 3, $\tau_k$ value may be defined as Formula 2.

$$\tau_k = N(\tau_{excess\_delay} + \tau_{prop\_delay} + \tau_{process\_delay}) \quad \text{[Formula 2]}$$

In Formula 2, $\tau_{excess\_delay}$ is an excess delay spread value meaning a maximum delay time required for a receiving end to perform a beam scanning repeatedly, $\tau_{prop\_delay}$ is a transmission delay value, $\tau_{process\_delay}$ means a PDP measurement time for each received (Rx) beam lobe and a strong ray detection time, and N means the number of receiving side beam lobes.

The receiving end repeats the above process by changing the entire transmitted (Tx) beam lobes 1~K at 360°. Hence, a beam scanning complete time of the receiving end is $K\tau_k$. Herein, K means the number of the entire transmitted (Tx) beams.

Referring to FIG. 4, if a user equipment that is a receiving end completes a beam scanning, it sends a pilot signal to a mmWave base station again. Thereafter, the user equipment performs 360° beam scanning to determine a transmitting side lobe index. Hence, a time of completing a Tx/Rx beam scanning becomes $K\tau_i + \tau_{tx\_scan}$.

Table 4 defines parameters for beam scanning complete time measurement.

TABLE 4

| | |
|---|---|
| $\tau_{excess\_delay}$ | 1 us |
| $\tau_{prop\_delay}$ | 5 us |
| $\tau_{process\_delay}$ | 670 us |
| N (beamwidth = 36 degree) | 100 (vertical + horizontal) |
| K (beamwidth = 36 degree) | 100 (vertical + horizontal) |
| $\tau_{tx\_scan}$ | 100 * 670 us |

If parameters for a beam scanning are defined as Table 4, a total Tx/Rx beam scanning time becomes about 100*100*(1+5+670)+100*670=6.827 sec. Namely, it can be observed that overhead amounting to a considerably long time is generated.

Yet, channel characteristic varies according to user's instant motion in a narrow cell coverage due to mmWave property. If almost 7 seconds are consumed for the beam scanning, it causes a problem that a mmWave service appropriate for the varying channel characteristic cannot be provided. Therefore, for a mmWave link connection through a general beam scanning, a simpler processing method is required.

2.2 Ray Scanning Method

FIG. 5 is a diagram showing one example of PAS distribution according to a location of each transceiving end on 60 GHz band. Particularly, FIG. 5 (a) shows a measurement state of indoor AoA (angle of arrival) and FIG. 5 (b) shows a measurement state of AOA on a corridor in a building.

Like FIG. 5, according to the space environment property of a reception location, it can be observed that PAS indicating a power amount according to an antenna angle of a user equipment changes variously. In mmWave using a high frequency band, the environmental property of the user equipment appears more clearly in comparison with a low frequency band.

FIG. 6 is a diagram showing one example of PAS distribution according to a location of each transceiving end on 28 GHz band. FIG. 6 (a) shows a PAS measurement result in a city area corresponding to NLoS (non line of sight) environment and FIG. 6(b) shows a PAS measurement result in a general LoS (line of sight) environment.

Through measurement, Rappaport team shows that PAS is determined according to regional location features of a receiver in NLoS environment (i.e., situation that link is connected owing to reflection and refraction by buildings, etc.) on 28 GHz band similar to 60 GHz band. Such a result predicts that a reception power is sufficiently reduced if AoA is further twisted with reference to boresight in a general LoS environment and that a reception power change will appear for each AoA according to the environmental features.

Therefore, if a mmWave user equipment analyzes the unique features for a wireless environment through a scanning scheme based not on beamforming but on ray scanning, such an analysis can be usefully used as a tool for obtaining a lobe of a space candidate or the like on a beam scanning or providing information to enable a receiver to detect resolvable rays distributed variously.

2.3 Relation Between Unique Environmental Element (PDP/PAS) and Directional Antenna Using a directional antenna and beamforming in a mmWave system obtains a beam gain and should be basically accompanied to extend a mmWave cell boundary restricted by the mmWave unique property. Yet, the unique property of the mmWave link is changed due to the use of the directional antenna and the beamforming.

FIG. 7 is a diagram showing one example of effect for a directional antenna in a mmWave system. Particularly, FIG. 7 (a) shows a variation of PAS according to bandwidth, and FIG. 7 (b) shows RMS DS change by a directional antenna.

In FIG. 7 (a), α means a bandwidth. Generally, PAS has distributions of laplacian/uniform/Gaussian and the like according to the environmental features. Yet, since a range of the bandwidth is restricted due to the use of the directional antenna and the beamforming, the distribution is changed into truncated laplacian/Gaussian or the like.

Due to the limited AoA like FIG. 7 (b), a delay spread value is reduced as well. Hence, the environmental property in using a beamforming in a mmWave link cannot be regarded as the unique mmWave link environmental property.

Hence, for the environmental property analysis and information acquisition of the unique mmWave link, an omnidirectional antenna based ray scanning method is required.

2.4 Hierarchical Beam Scanning Method

Figure 8:
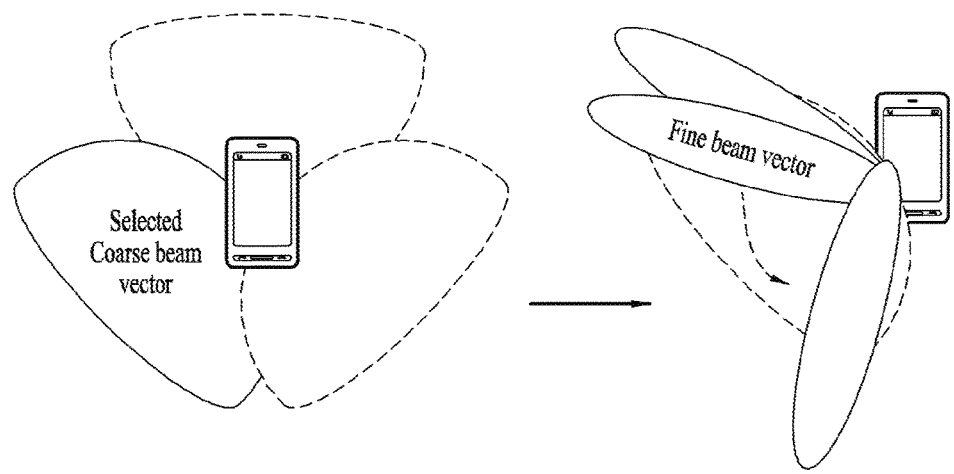
FIG. 8 is a diagram showing one of hierarchical beam scanning methods.

FIG. 8 is a diagram illustrating one example of hierarchical beam scanning methods.

The hierarchical beam scanning method is a method for selecting a coarse beam vector and then reducing an overall scanning time using a fine beam vector.

The following Table 5 defines parameters needed to measure the hierarchical beam scanning completion time.

TABLE 5

| | |
|---|---|
| $\tau_{excess\_delay}$ | 1 us |
| $\tau_{prop\_delay}$ | 5 us |
| $\tau_{process\_delay}$ | 670 us |
| $N_{Coarse}$ (beamwidth = 120 degree) | 9 (vertical + horizontal) |
| $N_{fine}$ (beamwidth = 30 degree) | 16 per one coarse beam (vertical + horizontal) |
| K (beamwidth = 36 degree) | 100 (vertical + horizontal) |
| $\tau_{tx\_scan}$ | 100 * 670 us |

Referring to FIG. 8, the UE may decide a coarse beam having a range of 120 degrees. Thereafter, scanning of the fine beam vector may be confirmed within the selected coarse beam. When using the hierarchical beam scanning method, the hierarchical beam scanning completion time may be decided as shown in the following formula 3.

$$\tau_k = (N_{Coarse} + N_{fine}) \times (\tau_{excess\_delay} + \tau_{prop\_delay} + \tau_{process\_delay})$$ [Formula 3]

In consideration of Table 5 and Formula 3, a total time in which the UE performs hierarchical beam scanning may be reduced to 100*(9+16)*676+100*670=1.757 sec. Compared with general beam scanning, the total scanning time is reduced. However, because the coarse beam vector is post-processed, the selected coarse beam vector cannot be utilized during scanning for the fine beam vector. In addition, the beam is pre/post-processed during transmission/reception (Tx/Rx) times, such that the hierarchical beam scanning method may have difficulty in determining unique characteristics of each channel.

Figure 9:
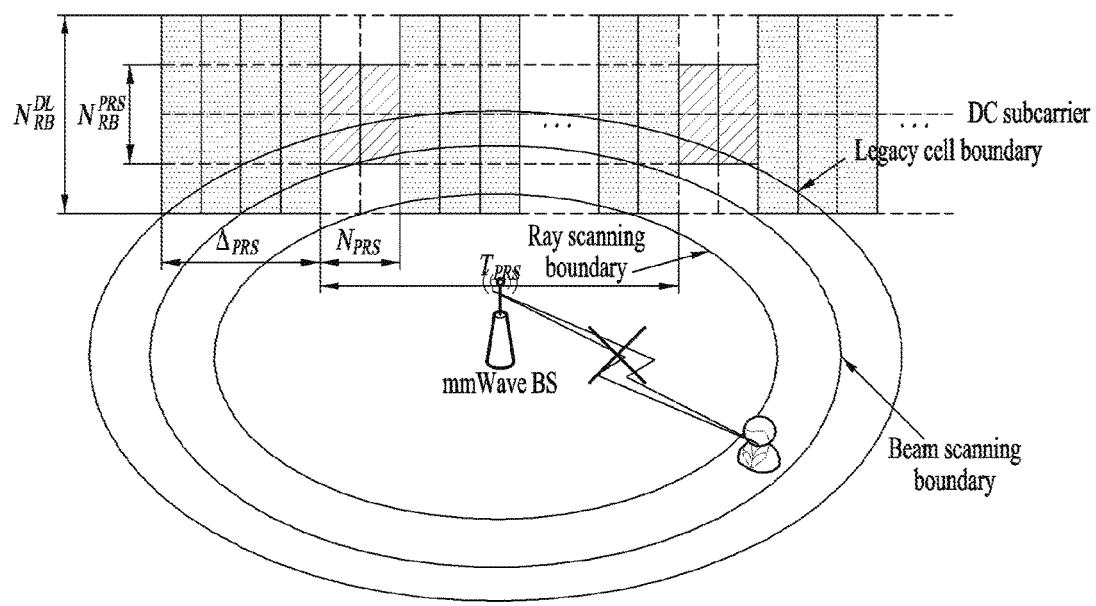
FIG. 9 is a diagram showing a case that a user equipment fails to detect a pilot signal because the user equipment is located outside a ray scanning cell boundary in the course of an mmWave ray scanning.

2.5 Problem of mmWave Cell Boundary Reduction According to mmWave Ray Scanning Scheme FIG. 9 is a diagram showing a case that a user equipment fails to detect a pilot signal because the user equipment is located outside a ray scanning cell boundary in the course of an mmWave ray scanning.

In FIG. 9, an outermost cell boundary means a boundary of a legacy serving cell, a middle cell boundary indicates a cell boundary capable of a beam scanning, and an inner most cell boundary indicates a cell boundary capable of a ray scanning.

Here, if a user equipment is located outside a ray scanning boundary, the user equipment is unable to receive an mmWave pilot signal transmitted by an mmWave base station. Namely, the user equipment fails in an mmWave ray scanning. In this case, the user equipment has no choice but to perform a beam scanning in an exhausted manner. Moreover, if the user equipment is located outside an mmWave beam scanning boundary, since the user equipment may possibly fail in a beam scanning as well, the user equipment has no choice but to perform communication through a legacy band.

In the embodiments of the present invention, a serving cell may mean an area managed by a base station in a sense of a geographic meaning. In aspect of frequency, a serving cell may be configured with one or more downlink component carriers and zero or more uplink carriers. Herein, a serving cell has the concept of including a primary cell (P cell) and a secondary cell (S cell). The P cell means a serving cell for a user equipment to transceive control information and/or data with a base station, and the S cell means a serving cell for a user equipment to transceive data with a base station.

3. mmWave Scanning Scheme Determining Method Based on Power Measurement

Embodiments of the present invention described in the following relate to methods for determining whether to select an mmWave ray scanning or an mmWave beam scanning for a communication between an mmWave base station (mmWave BS) and an mmWave user equipment (mmWave UE) based on RSSI or RSRP information or whether to perform a communication on a legacy band only.

Basic assumptions for performing the embodiments of the present invention are described as follows.

(1) Assume that mmWave BSs and an mmWave UE have performance capable of multi joint transmission to secure LoS link. Namely, assume that the mmWave UE and the mmWave BS can support Comp capable of cooperative transmission in several serving cells or DC (dual connectivity) of establishing RRC connection to two or more serving cells.

(2) In order to resolve mmWave link instability caused due to such a reason as LoS/NLoS transition, link hindrance of a human obstacle and/or a receiving user (e.g., human body impact) or the like, locations of mmWave BSs can be configured to be disposed more densely than the existing small cells.

(3) An mmWave primary cell and a legacy P cell can be configured different from each other. Namely, a single UE may be connected to an mmWave P cell while connected to a legacy P cell. If performance of a UE can support both a legacy P cell and an mmWave P cell, a connection between the legacy P cell and the mmWave P cell can be configured separately if necessary. In such cases, a P cell for an mmWave system and a P cell for a legacy system may be configured separately on separate bands, respectively.

3.1 mmWave Scanning Scheme Determining Method-1

FIG. 10 is a flowchart for determining an mmWave scanning method.

Assume that an RRC connection between a BS (base station) and a UE (user equipment) is already established through a legacy link. And, assume that the BS and the UE have performance for mmWave band transmission. The BS can transmit a pilot signal for a ray scanning in downlink (S1010).

The UE may attempt a detection of an mmWave pilot signal by monitoring an mmWave pilot detection window on an mmWave band. In doing so, the UE measures mmWave pilot signal detection and a power delay profile (e.g., RSRP, RSSI, etc.), thereby determining a success or failure in detection of the mmWave pilot signal with reference to a first threshold $\alpha$. The first threshold $\alpha$ is a reference value of a power unit (S1020).

A method of determining the first threshold $\alpha$ in the step S1020 is represented as Formula 4.

$$\hat{d}_m = \arg_{d_m}[SNR_{Rx(min\_detectable)} - P_{Tx} + $$
$$PL(d_m) + (NF + 10\log_{10}(BW)) = 0]$$
$$\alpha = P_{Tx} - PL(\hat{d}_m)$$
[Formula 4]

$\hat{d}_m$ means an estimated distance between a BS and a UE, and Formula 4 is provided to find a point at which an SNR measured by the UE is minimized. Here, $P_{Tx}$ means a transmit power of an mmWave BS, $PL(d_m)$ means a path loss function for a distance (meter), NF means a noise floor (e.g., −174 dBm/Hz at the room temperature of 290K), and BW means a transmission frequency band. Moreover, $SNR_{Rx(min\_detectable)}$ means a minimum reception SNR for mmWave pilot signal power detection. Through Formula 4, it is able to determine the threshold $\alpha$ for determining a ray scanning or a beam scanning.

Hence, if the reception power of the mmWave pilot signal received from the BS is higher than $\alpha$ in the step S1020, the UE performs an mmWave ray scanning on an mmWave band (S1030).

If the mmWave pilot signal reception power is lower than $\alpha$, the UE can perform a process for determining whether to perform an mmWave beam scanning or a communication through a legacy system. Hence, the UE can transmit feedback information for checking a presence or non-presence of mmWave beam scanning pilot transmission possibility through a legacy uplink band (S1040).

A method of determining the feedback information to transmit in the step S1040 is described as follows.

The UE an determine feedback information based on Formula 5.

$$\beta_{min} = \alpha - G_{tx\_max} - G_{rx\_max}$$
[Formula 5]

In Formula 5, a second threshold $\beta_{min}$ means a minimum power threshold in consideration of a Tx/Rx beam gain, $G_{tx\_max}$ means a transmitting side mmWave maximum beam gain, and $G_{rx\_max}$ means a receiving side mmWave maximum beam gain.

For example, if an mmWave Rx power $P_{rx}$ is determined as $P_{rx} \le \alpha$, a UE sends 1-bit feedback information set to mmWave '1' to a BS. If receiving the feedback information set to '1', the BS checks legacy pilot acquisition and measures RSRP of a legacy pilot, thereby performing a procedure for checking whether an mmWave beam scanning and a legacy system are used with the UE. If receiving the feedback information set to '0, the BS can perform the mmWave ray scanning.

If the UE fails to detect the mmWave pilot signal in the step S1020, the reception power is regarded as smaller than $\alpha$. Hence, the UE can send the feedback information set to '1' to the BS.

Referring again to FIG. 10, the UE having failed in the detection of the mmWave pilot signal can perform a process for determining whether to perform an mmWave beam scanning or a legacy communication (S1050).

To this end, the UE detects RSRP or RSSI by receiving a legacy pilot signal through a legacy system band. The legacy pilot signal can be transmitted through a frequency band different from that of the mmWave pilot signal in the step S1010 in the same time slot of the mmWave pilot signal in the step S1010. Or, after failing in the mmWave pilot signal detection, the UE may detect a reception of a legacy pilot signal on a legacy system band.

Based on the legacy pilot signal, the UE can estimate a reception power of an mmWave pilot signal to be transmitted through an mmWave band. Formula 6 in the following shows Friis formula for calculating a power loss level due to a frequency difference.

$$P_{RX} = \left(\frac{\lambda}{4\pi \cdot d}\right)^2 \cdot P_{TX} = \left(\frac{c}{4\pi \cdot f \cdot d}\right)^2 \cdot P_{TX}$$
[Formula 6]

Hence, the estimated power of the mmWave pilot signal measured by the UE based on the legacy pilot signal can be calculated as Formula 7.

$$\hat{P}_{Rx,mmWave} = P_{Tx,mmWave} - (P_{Tx,legacy} - P_{Rx,legacy}) + \text{add\_loss}_{freq}$$
[Formula 7]

In Formula 7, add_loss$_{freq}$ means ab additional attenuation power loss generated from a frequency difference between a legacy transmission band and an mmWave transmission band. This value can be obtained through Formula 6. $P_{Tx,legacy}$ means a legacy pilot transmit power of the BS, $P_{Rx,legacy}$ means a legacy pilot reception power of the UE, and $P_{Tx,mmwave}$ means an mmWave pilot signal transmit power of the BS. Hence, $\hat{P}_{Rx,mmWave}$ can be defined as an mmWave pilot signal reception estimated power.

For example, assuming that a legacy transmission band and an mmWave transmission band are set to 2 GHz and 30 GHz, respectively, the UE can estimate a reception power of the mmWave pilot signal using a measurement power for the legacy pilot signal based on Friis formula of Formula 6. In doing so, on the omni-antenna basis, in comparison with 2 GHz, about 23.5 dB path loss exists on 30 GHz additionally. Hence, it can be determined as add_loss$_{freq}$=23.5 dB.

If the $\hat{P}_{Rx,mmWave}$ that is the estimated power of the mmWave pilot signal measured by the UE is greater than the second threshold $\beta_{min}$, the UE can perform an mmWave beam scanning process with the BS (S1060).

If the $\hat{P}_{Rx,mmWave}$ value meets the condition of $\hat{P}_{Rx,mmWave} \leq \beta_{min}$, the UE can communicate with the base station through the legacy band by regarding the mmWave beam scanning as difficult to be performed. Namely, the UE determines that the mmWave pilot signal cannot be detected despite performing the mmWave beam scanning and does not perform an mmWave scanning operation (S1070).

In the step S1050, the UE can feed back of a presence or non-presence of performing an mmWave beam scanning operation or a legacy transmission operation to the BS. Table 6 in the following shows one example of feedback information according to an estimated power of an mmWave pilot signal.

TABLE 6

|  | $\hat{P}_{Rx,mmWave} \leq \beta_{min}$ | Otherwise |
|---|---|---|
| Feedback | 1 | 0 |

Namely, if a 1-bit feedback value is set to '1', it indicates that a normal communication through a legacy band should be performed. If set to '0', it indicates that an mmWave beam scanning process can be performed.

3.2 mmWave Scanning Scheme Determining Method-2

The method described in the paragraph 3.1 relates to a method for a UE to perform a feedback process twice to indicate an mmWave scanning scheme and a presence of non-presence of performing a legacy operation. Described in the following is a method for a UE to send a feedback, which indicates that the UE will perform a prescribed operation, to a BS once.

In FIG. 10, the UE performs the detection of the mmWave pilot signal to perform the mmWave ray scanning in the step S1020. In doing so, the UE can send a 2-bit feedback value to the BS by comparing a detected power $P_{rx}$ of a pilot signal with a first threshold and a second threshold. Table 7 shows 2-bit feedback values.

TABLE 7

| Bit value | Condition | Contents |
|---|---|---|
| 0b00 | $\beta_{min} \leq P_{rx}$ | Operate as a legacy system |
| 0b01 | $\beta_{min} \leq P_{rx} \leq \alpha$ | Instruct to perform a mmWave beam scanning |
| 0b10 | $P_{rx} \leq \alpha$ | Instruct to perform a mmWave ray scanning |
| 0b00 | — | Reserved value |

Namely, after receiving the 2-bit feedback information, the BS can determine what kind of operation will be performed with the UE.

4. mmWave Pilot Signal Configuring Method

Since an mmWave UE is located outside an mmWave ray or beam scanning boundary or an energy level of an mmWave received signal is very low, if the mmWave UE is unable to detect an mmWave pilot signal, the corresponding mmWave UE should attempt to decode the mmWave pilot signal on a full mmWave band for a long time. Such an operation may cause a long processing delay of the mmWave UE.

Therefore, according to embodiments of the present invention, a sync for an mmWave pilot signal detection can be configured to match a legacy frame or symbol, or a specific legacy pilot signal and an mmWave pilot signal can be configured to be transmitted by matching sync each other. For example, a BS and/or UE transmits a specific legacy pilot signal on a legacy band and also transmits an mmWave pilot signal on an mmWave band in a manner of matching time sync.

In doing so, even if an mmWave UE and/or BS fails to detect an mmWave pilot signal, it is able to easily obtain a transmitted location of the mmWave pilot signal as well as a presence or non-presence of a transmission of the mmWave pilot signal. Moreover, an mmWave beam/ray scanning process can be performed more quickly.

Although various RSs exist in a legacy system, the RSs aim at channel measurement on a legacy band. According to embodiments of the present invention, in order to inform an mmWave UE of a transmission timing of an mmWave ray or beam scanning pilot signal, the UE can be configured to transmit a legacy pilot signal.

The mmWave UE can estimate an mmWave received signal power by measuring RSTP or RSSI of a legacy pilot and determine whether to perform the mmWave beams scanning or use a legacy link only.

FIG. 11 is a diagram showing a case of determining an mmWave pilot detection window for transmitting an mmWave pilot signal based on locations of a legacy frame and symbol.

According to embodiments of the present invention, an mmWave pilot detection window may be called a pilot search space. Referring to FIG. 11, since an mmWave UE and BS are assumed as supporting comp or dual connectivity (DC), they have performance capable of receiving both an mmWave band and a legacy band.

In this case, an mmWave pilot detection window is configured in a manner that a frequency band differs despite that a time interval is identical to that a specific RS transmission region on a legacy band. Namely, such a window is configured on an mmWave band. Hence, if a UE receives a specific RS on a legacy band, it is able to detect an mmWave pilot signal on a corresponding mmWave band. In FIG. 11, a part discriminated with a box in each of the legacy band and the mmWave band may mean 1 TTI (transmit time interval).

Figure 12:
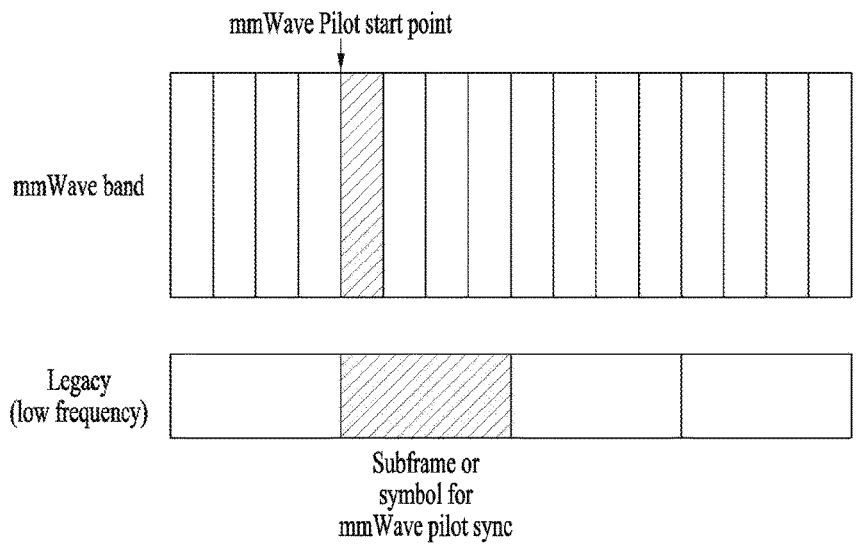
FIG. 12 is a diagram showing a transmission start point of an mmWave pilot signal based on locations of a legacy subframe and symbol.

FIG. 12 is a diagram showing a transmission start point of an mmWave pilot signal based on locations of a legacy subframe and symbol.

In order to match sync of an mmWave pilot signal, it is able to set a legacy subframe index or a symbol index and a frame index. In FIG. 12, a UE may be already aware that a specific RS is transmitted in a specific subframe of a legacy band. In such a case, the UE may perform a detection of an mmWave pilot signal in a subframe, symbol or frame of an mmWave band corresponding to a start point of the subframe, in which the specific RS is transmitted, on the legacy band.

Yet, in FIG. 12, a size of a time domain of the mmWave pilot detection window may be set irrespective of a size of a time domain for transmitting a specific legacy pilot.

Figure 13:
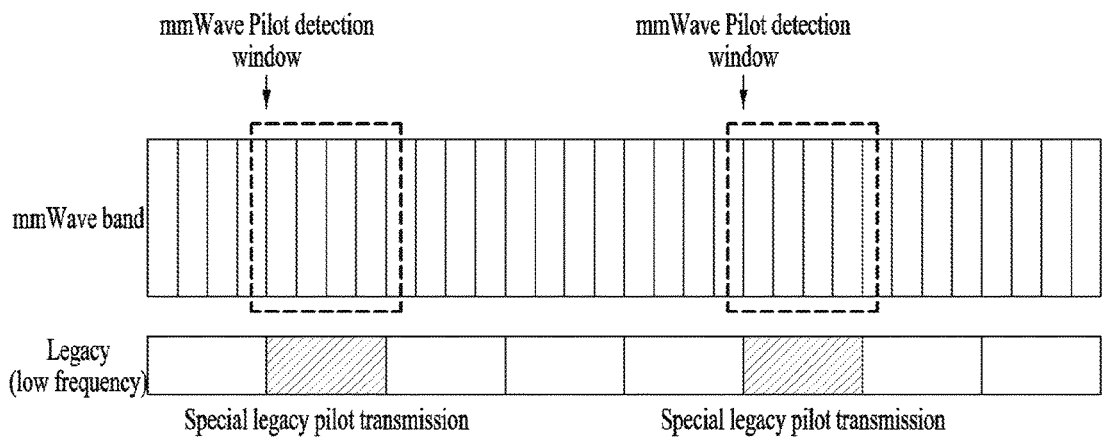
FIG. 13 is a diagram to describe a method of defining a new reference signal for an mmWave pilot signal transmission on a legacy band.

FIG. 13 is a diagram to describe a method of defining a new reference signal for an mmWave pilot signal transmission on a legacy band.

According to an embodiment in FIG. 13, by indicating a transmitted location of an mmWave pilot signal and defining a new legacy pilot signal capable of measuring SRP or RSSI of a legacy band, the new legacy pilot signal can be discriminated from another pilot signal of the legacy band. Namely, although the configuration of the existing legacy pilot signal is used intactly for the detection of the mmWave pilot signal in FIG. 11 or FIG. 12, a new pilot signal transmitted on a legacy band is defined in FIG. 13.

In this case, the new legacy pilot signal can be flexibly transmitted in a legacy subframe or symbol. Namely, a transmitted location of the new legacy pilot signal can be configured to be transmitted according to the transmission need of a BS and/or UE instead of being always fixed. For example, a location at which a new legacy pilot signal is transmitted can be transmitted to a UE through legacy PDCCH (physical downlink control channel) for transmitting control information on a legacy band.

In this case, the new legacy pilot signal is configured to have a transmission pattern different from that of an existing legacy reference signal (RS), and the UE can match the transmission timing of the legacy power measurement and mmWave pilot signal.

Figure 14:
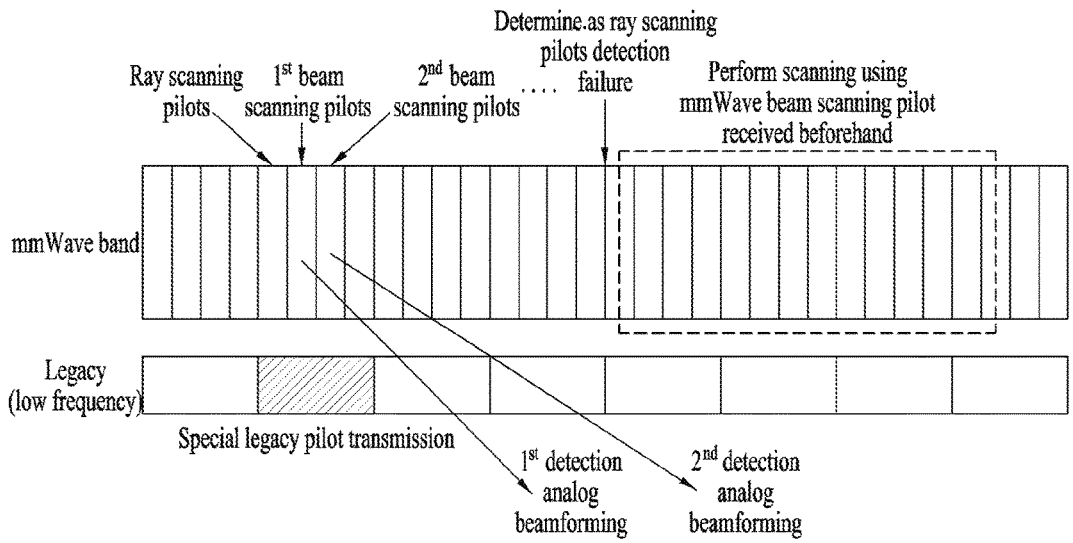
FIG. 14 is a diagram to describe a method of detecting an mmWave pilot signal of an mmWave band using a legacy pilot signal of a legacy band.

FIG. 14 is a diagram to describe a method of detecting an mmWave pilot signal of an mmWave band using a legacy pilot signal of a legacy band.

In FIG. 14, a BS can reduce overhead of a beam scanning after a ray scanning by transmitting an mmWave pilot signal for an mmWave ray or beam scanning at the transmission timing of a specific legacy pilot signal.

Referring to FIG. 14, a UE can receive a specific legacy pilot signal on a legacy band. In doing so, the UE can detect an mmWave pilot signal on an mmWave band based on the schemes described with reference to FIGS. 11 to 13. For example, the UE attempts a detection of an mmWave pilot signal for an mmWave ray scanning in a frame, subframe, slot or symbol of an mmWave band having a time sync matched with a subframe in which a specific legacy pilot is transmitted. Thereafter, the UE can detect an mmWave pilot signal for an mmWave beam scanning in a contiguous time interval.

In case that the UE fails in the mmWave ray scanning in FIG. 14, in order to implement an mmWave beam scanning, a BS can transmit a beam scanning pilot in advance when transmitting a specific legacy pilot. Hence, the UE can perform an analog beam scanning corresponding to a beam scanning pilot. Namely, if the UE fails in a ray scanning, the UE performs an analog beam scanning using a beam scanning pilot received before the beam scanning, thereby reducing mmWave scanning overhead. Here, the analog beam scanning means a process for forming a directional beam using directionality features in an RF (radio frequency) end.

Figure 15:
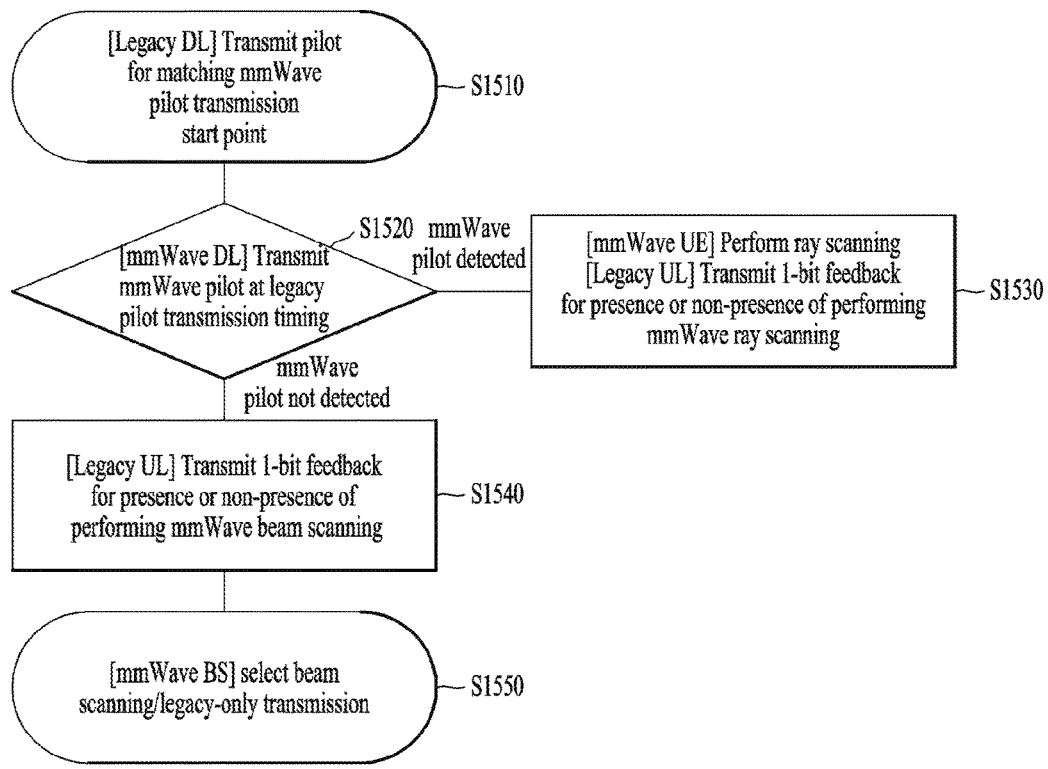
FIG. 15 is a diagram showing one of methods for performing an mmWave scanning using a legacy pilot.

FIG. 15 is a diagram showing one of methods for performing an mmWave scanning using a legacy pilot. Methods of performing a scanning using a legacy pilot as well as an mmWave pilot for an mmWave scanning are described as follows.

Referring to FIG. 15, a BS can transmit a specific legacy pilot for matching a transmission start timing of an mmWave pilot signal through a legacy band. Moreover, the BS can transmit an mmWave pilot signal in mmWave downlink in time for a timing of a legacy pilot signal (S1510).

If receiving a specific pilot signal on a legacy band, a UE attempts an mmWave pilot detection on a corresponding mmWave band (S1520).

If the UE detects the mmWave pilot signal in the step S1520, the UE performs an mmWave ray scanning with the BS. And, the UE can transmit 1-bit feedback information in legacy uplink to indicate whether the mmWave ray scanning is performed (S1530).

If the UE fails in the detection of the mmWave pilot signal in the step S520, the UE can transmit 1-bit feedback information in legacy uplink to indicate whether an mmWave beam scanning is performed (S1540).

The feedback informations transmitted in the step S1530 and S1540 can be configured by referring to the contents described in the paragraph 3.1.

If receiving the 1-bit feedback information for a presence or non-presence of performing the mmWave beam scanning in the legacy uplink, the BS may perform an mmWave beam scanning process with the UE according to the feedback information or perform a legacy communication on a legacy band only by abandoning the mmWave band support. In the embodiments of the present invention, the legacy communication may mean a data transceiving operation between a UE and a BS on a legacy band and/or a signaling for an mmWave ray/beam scanning process on an mmWave band.

In FIG. 10 and FIG. 15, [mmWave UE] and [mmWave BS] means that a UE and a BS operate on an mmWave band. And, [legacy UE] and [legacy BS] means that a UE and a BS operate on a legacy band.

5. Implementation Device

Figure 16:
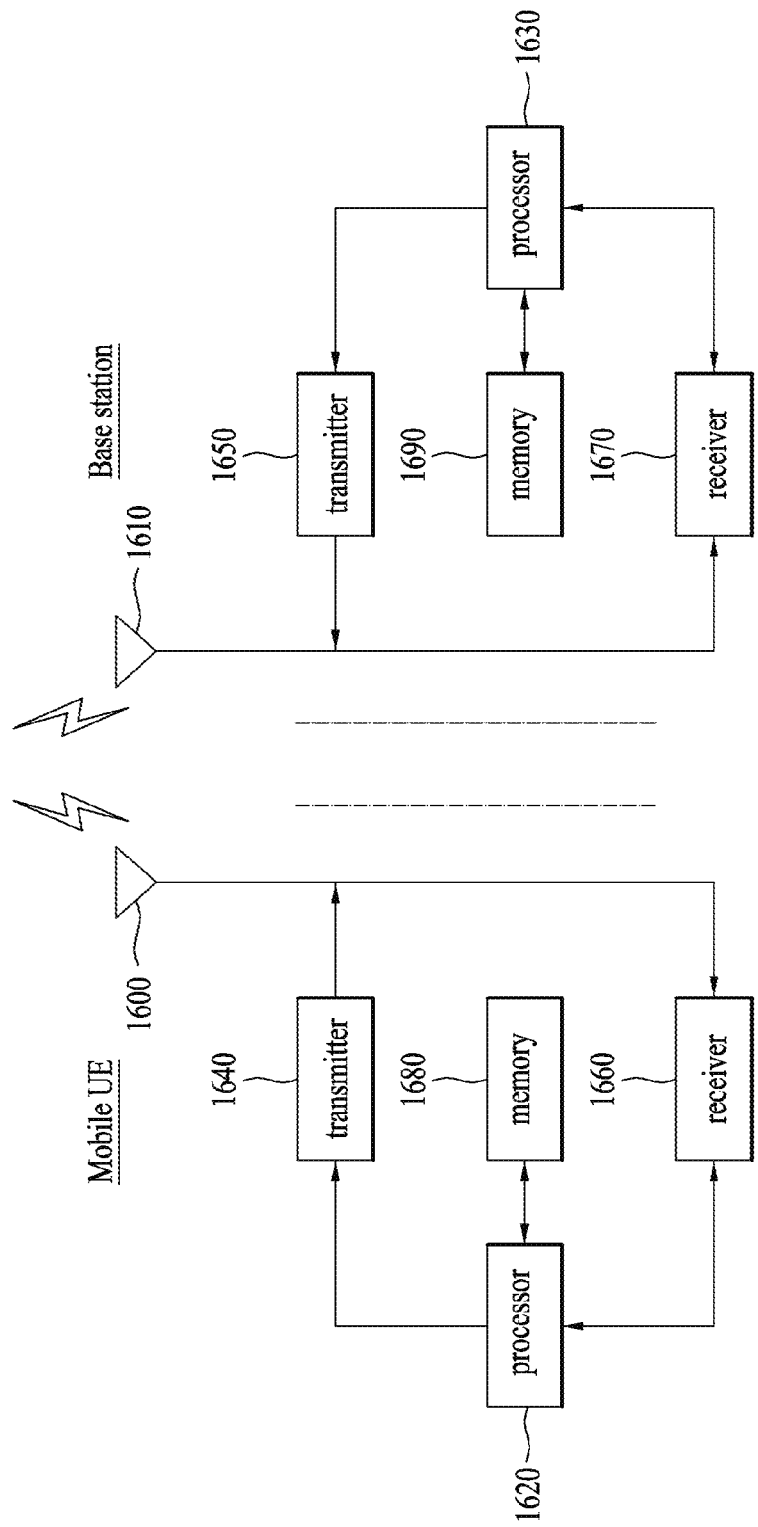
FIG. 16 is a diagram of a device that is a means for implementing the methods described with reference to FIGS. 1 to 15.

A device described in FIG. 16 is a means for implementing the methods described with reference to FIGS. 1 to 15.

A UE (user equipment) can operate as a transmitter in uplink or a receiver in downlink. A BS (base station) (or, eNB: e-Node B) can operate as a receiver in uplink or a transmitter in downlink.

Namely, the UE/BS may include a transmitter 1640/1650 and a receiver 1650/1670 to control transmission and reception of data and/or messages, and may also include an antenna 1600/1610 and the like to transmit and receive information, data and/or messages.

The UE/BS may include a processor 1620/1630 for performing embodiments of the present invention mentioned in the foregoing description and a memory 1680/1690 for storing a processing process of the processor temporarily or consistently.

The embodiments of the present invention can be performed using the components and functions of the UE and BS devices. For instance, the UE can determine whether to perform an mmWave ray or beam scanning according to a presence or non-presence of a detection of an mmWave pilot signal. Moreover, although the UE detects the mmWave pilot signal, the UE may determine whether to perform an mmWave beam scanning or a legacy communication according to a size of a transmit power. The UE can transmit feedback information to inform the BS of a presence or non-presence of the mmWave ray/beam scanning or the legacy communication. For details, contents of the first to third paragraphs can be referred to.

Moreover, the BS can use a pilot or reference signal transmitted on a legacy band to transmit an mmWave pilot signal. The BS may reuse a specific pilot signal among previously used pilot signals for an mmWave pilot detection as the pilot signal transmitted on the legacy band or may define a new pilot signal used for the usage of a detection of an mmWave pilot signal only. For details, contents of the fourth paragraph can be referred to.

The transmitter and receiver included in the UE/BS can perform a packet modulation/demodulation function for data transmission, a fast packet channel coding function, OFDMA (orthogonal frequency division multiple access) packet scheduling, TDD (Time Division Duplex) packet scheduling and/or a channel multiplexing function. Moreover, the UE/BS of FIG. 16 may further include a low power RF/IF (Radio Frequency/Intermediate Frequency) module.

Meanwhile, in the present invention, a user equipment may use a PDA (Personal Digital Assistant), a cellular phone, a PCS (Personal Communication Service) phone, a GSM (Global System for Mobile) phone, a WCDMA (Wideband CDMA) phone, an MBS (Mobile Broadband System) phone, a hand-held PC, a notebook PC, a smart phone, a MM-MB (Multi Mode-Multi Band) terminal or the like.

Here, the smart phone is a user equipment having the mixed benefits of a mobile communication terminal and a PDA, and may mean a terminal in which PDA's data communication functions such as schedule management, fax transmission/reception, internet access and the like are integrated are integrated with the mobile terminal. Moreover, the MM-MB terminal means a terminal operational in a mobile internet system and other mobile communication systems (e.g., CDMA (Code Division Multiple Access) 2000 system, WCDMA (Wideband CDMA) system, etc.) by having a multi-modem chip built inside.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in the memory unit 1680/1690 and is then drivable by the processor 1620/1630. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present are applicable to various wireless access systems. Examples of the various wireless access systems include 3GPP (3rd Generation Partnership Project) system, 3GPP2 system and/or IEEE 802.xx (Institute of Electrical and Electronic Engineers 802) system and the like. The embodiments of the present are applicable to all technical fields having the various wireless access systems applied thereto as well as to the various wireless access systems.

What is claimed is:

1. A method of performing an mmWave scanning by a user equipment in a wireless access system supportive of a millimeter wave (mmWave) technology, comprising:
   attempting a detection of an mmWave pilot signal by monitoring an mmWave pilot detection window on an mmWave band;
   transmitting a feedback signal for indicating whether the mmWave pilot signal is detected in uplink of a legacy band;
   if the mmWave pilot signal is detected, performing an mmWave ray scanning with a base station; and
   if the mmWave pilot signal is not detected, determining whether to perform an mmWave beam scanning or a legacy communication.

2. The method of claim 1, wherein if the mmWave pilot signal is not detected, the user equipment determines whether to perform the mmWave beam scanning or the legacy communication by estimating a reception power of the mmWave pilot signal based on a reception power of a legacy pilot signal transmitted through the legacy band.

3. The method of claim 2, further comprising transmitting feedback information through the legacy band in order for the user equipment to inform the base station whether the mmWave beam scanning or the legacy communication is performed.

4. The method of claim 1, wherein the mmWave pilot detection window is configured to correspond to a transmitted location of a specific legacy pilot among legacy pilots transmitted through the legacy band.

5. The method of claim 1, wherein the mmWave pilot detection window is configured to correspond to a transmitted location of a new legacy pilot defined on the legacy band for the detection of the mmWave pilot signal.

6. A user equipment performing an mmWave scanning in a wireless access system supportive of a millimeter wave (mmWave) technology, comprising:
   a receiver;
   a transmitter; and
   a processor configured to support the mmWave scanning,
   wherein the processor is further configured to control the receiver to attempt a detection of an mmWave pilot signal by monitoring an mmWave pilot detection window on an mmWave band and control the transmitter to transmit a feedback signal for indicating whether the mmWave pilot signal is detected in uplink of a legacy band,
   wherein if the mmWave pilot signal is detected, the processor is further configured to perform an mmWave ray scanning with a base station, and
   wherein if the mmWave pilot signal is not detected, the processor is further configured to determine whether to perform an mmWave beam scanning or a legacy communication.

7. The user equipment of claim 6, wherein if the mmWave pilot signal is not detected, the processor determines whether to perform the mmWave beam scanning or the legacy communication by estimating a reception power of the mmWave pilot signal based on a reception power of a legacy pilot signal transmitted through the legacy band.

8. The user equipment of claim 7, wherein the processors is configured to control the transmitter to transmit feedback information through the legacy band in order to inform the base station whether the mmWave beam scanning or the legacy communication is performed.

9. The user equipment of claim 6, wherein the mmWave pilot detection window is configured to correspond to a transmitted location of a specific legacy pilot among legacy pilots transmitted through the legacy band.

10. The user equipment of claim 6, wherein the mmWave pilot detection window is configured to correspond to a transmitted location of a new legacy pilot defined on the legacy band for the detection of the mmWave pilot signal.

* * * * *